United States Patent
Mizunuma et al.

(10) Patent No.: US 7,484,950 B2
(45) Date of Patent: Feb. 3, 2009

(54) FORMING PHASE ALIGNMENT DEVICE IN FORMED SHEET MANUFACTURING APPARATUS

(75) Inventors: Koji Mizunuma, Shizuoka (JP); Toshihiko Kusago, Shizuoka (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 443 days.

(21) Appl. No.: 11/321,535

(22) Filed: Dec. 30, 2005

(65) Prior Publication Data

US 2006/0154790 A1    Jul. 13, 2006

(30) Foreign Application Priority Data

Jan. 7, 2005    (JP) ............................. 2005-003145

(51) Int. Cl.
*B29C 59/04* (2006.01)
(52) U.S. Cl. ...................................... 425/140; 425/367
(58) Field of Classification Search ................. 425/140, 425/141, 367

See application file for complete search history.

(56) References Cited

FOREIGN PATENT DOCUMENTS

JP    10-034748    *    2/1998
JP    2004-142182         5/2004

* cited by examiner

*Primary Examiner*—James Mackey
(74) *Attorney, Agent, or Firm*—DLA Pipet LLP (US)

(57) ABSTRACT

A first forming roll and a second forming roll are provided parallel and opposite to each other, and a double-surface formed sheet is formed by the first forming roll and the second forming roll. There are provided: phase adjusting unit configured to move the second forming roll in an axial direction of the second forming roll; an upper formed-shape detector which detects a formed shape of a front surface of the double-surface formed sheet; a lower formed-shape detector which detects a formed shape of a back surface of the double-surface formed sheet; front/back-surface phase difference arithmetic operating unit configured to compare detection signals of the upper and lower formed-shape detectors with each other, calculating a forming phase difference between the formed shapes of the front surface and back surface of the double-surface formed sheet with respect to the axial direction, and outputting a phase difference value signal indicating the forming phase difference; and phase alignment control processing unit configured to receiving the phase difference value signal, and outputting an instruction to the phase adjusting unit so that the forming phase difference can be reduced.

13 Claims, 4 Drawing Sheets

FORMING PHASE ALIGNMENT DEVICE IN FORMED SHEET MANUFACTURING APPARATUS

BACKGROUND OF THE INVENTION

1. Field of the Invention

The present invention relates to a forming phase alignment device in a formed sheet manufacturing apparatus, and particularly to a forming phase alignment device which aligns phases of a front and back of an optical high-precision double-surface formed sheet formed by an extrusion forming method.

2. Description of the Related Art

Forming of an optical high-precision double-surface formed sheet, in which irregularity patterns are formed on both front and back surfaces, such as a lenticular plate for use in a screen for a rear projector, is performed by an extrusion forming method by using a formed sheet manufacturing apparatus in which two forming rolls having patterns carved on outer circumferential surfaces are provided parallel and opposite to each other.

This formed sheet manufacturing apparatus includes one constructed to be capable of moving one of the forming rolls making a pair in a roll axis direction, that is, a sheet width direction by a phase adjustment mechanism driven by a servo motor in order to align forming phases of the front and back of the double-surface formed sheet in the roll axis direction (for example, refer to Japanese Patent Laid-Open Publication No. 2004-142182).

In the formed sheet manufacturing apparatus, periodic variations in one rotation of each of the rolls, which affect phase precision in the roll axis direction (a thrust direction), occur owing to precision of rotational mechanical parts constructing the formed sheet manufacturing apparatus, precision in the thrust direction, which is owned by the rolls themselves carved for the purpose of the forming, and the like.

In the phase adjustment mechanism in the formed sheet manufacturing apparatus in the related art, though adjustment of positional precision of the mechanism itself in the roll axis direction is accurate, information on actual forming precision of the front and back of such a product formed by the manufacturing apparatus is not included in control factors. Therefore, in the related art, further high-precision forming required for a final product is difficult.

In the optical high-precision double-surface forming by the extrusion forming method, a range of temperature set for the forming rolls for the purpose of the forming is widened owing to specifications of the product, a type of resin, a type of the forming patterns, and the like. For example, the temperature is set at 80° C. to 120° C. Moreover, a range of roll thrust conditions for the purpose of the forming is also widened. Accordingly, in order to cover such wide forming conditions, a range of force required for adjusting the phases of the forming rolls in the axial direction is also widened.

An option to select the mechanism for the purpose of mechanically clearing the conditions as described above is also limited, and variations of the selected mechanism in the thrust direction essentially occur. As the variations of the selected mechanism in the thrust direction, for example, ±4 μm is mentioned, which is present even in a high-precision thrust bearing. Moreover, in an actual machine, periodic variations in the thrust direction in terms of forming displacement are present in the case of processing the forming rolls as other bodies of rotation, resulting in compound variations of the bodies of rotation.

In such a control method at present, the information on the forming variations of the final product is not included, and accordingly, an influence of the compound variations of the bodies of rotation will appear on the product.

SUMMARY OF THE INVENTION

The present invention has been made in order to solve the above-described problem. It is an object of the present invention to provide a forming phase alignment device which precisely aligns forming phases of a front and back of a double-surface formed sheet, absorbs mechanical repeated displacement disturbing forming precision owned by a mechanism thereof, thereby being made capable of producing a high-precision double-surface formed sheet.

In order to achieve the above-described object, an aspect of the present invention is summarized to be a forming phase alignment device, including: a first forming roll; a second forming roll which forms a double-surface formed sheet together with the first forming roll, the second forming roll being provided parallel and opposite to the first forming roll; phase adjusting unit configured to move the second forming roll in an axial direction of the second forming roll; an upper formed-shape detector which detects a formed shape of a front surface of the double-surface formed sheet; a lower formed-shape detector which detects a formed shape of a back surface of the double-surface formed sheet; front/back-surface phase difference arithmetic operating unit configured to compare a detection signal of the upper formed-shape detector and a detection signal of the lower formed-shape detector with each other, calculating a forming phase difference between the formed shape of the front surface of the double-surface formed sheet and the formed shape of the back surface of the double-surface formed sheet with respect to the axial direction, and outputting a phase difference value signal indicating the forming phase difference; and phase alignment control processing unit configured to receive the phase difference value signal, and outputting an instruction to the phase adjusting unit so that the forming phase difference can be reduced.

According to the aspect of the present invention, phase adjustment is implemented by using, as a control deviation of a phase alignment control, an actual measurement value of a phase error of the formed sheet (a product sheet) as the final product. Accordingly, the phase error owing to residual displacement which occurs mechanically can be compensated, thus making it possible to produce a high-precision double-surface formed sheet with little error between phases of the front and back surfaces.

Moreover, the phase adjusting unit may include: a screw device, wherein the screw device may include: a servo motor; a screw stock member rotationally driven by the servo motor; and a nut member which moves the second forming roll in the axial direction, the nut member being engaged with the screw stock member in a screwed manner, fixed so as not to rotate, and displaced in a same direction as the axial direction of the second forming roll by rotation of the screw stock member, and the phase alignment control processing unit may output a drive instruction to the servo motor so that the forming phase difference can be reduced.

With the above-described construction, a similar effect to that of the above-described aspect can be obtained.

Moreover, the phase alignment control processing unit may perform a phase alignment control based on the phase difference value signal for one rotation of the second forming roll.

With the above-described construction, the phase alignment control processing unit can perform the phase alignment control based on the phase difference value signal for one rotation of the second forming roll.

Furthermore, the phase alignment control processing unit may perform a phase alignment control based on an average value of the phase difference value signals for plural rotations of the second forming roll.

With the above-described construction, phase difference data for the necessary number of rotations, for example, five rotations and ten rotations, is averaged, and by using an obtained result as a phase control signal, a drive of a phase adjustment mechanism, that is, a phase-adjusting speed-reduction motor is controlled. Accordingly, even if the above-described forming phase difference data includes data of long-period variations disrelated to the rotations of the first and second forming rolls, and data of short-period variations owing to sudden disturbances, phase adjustment corresponding to the variations described above can be performed.

DESCRIPTION OF THE PREFERRED EMBODIMENT

Figure 1:
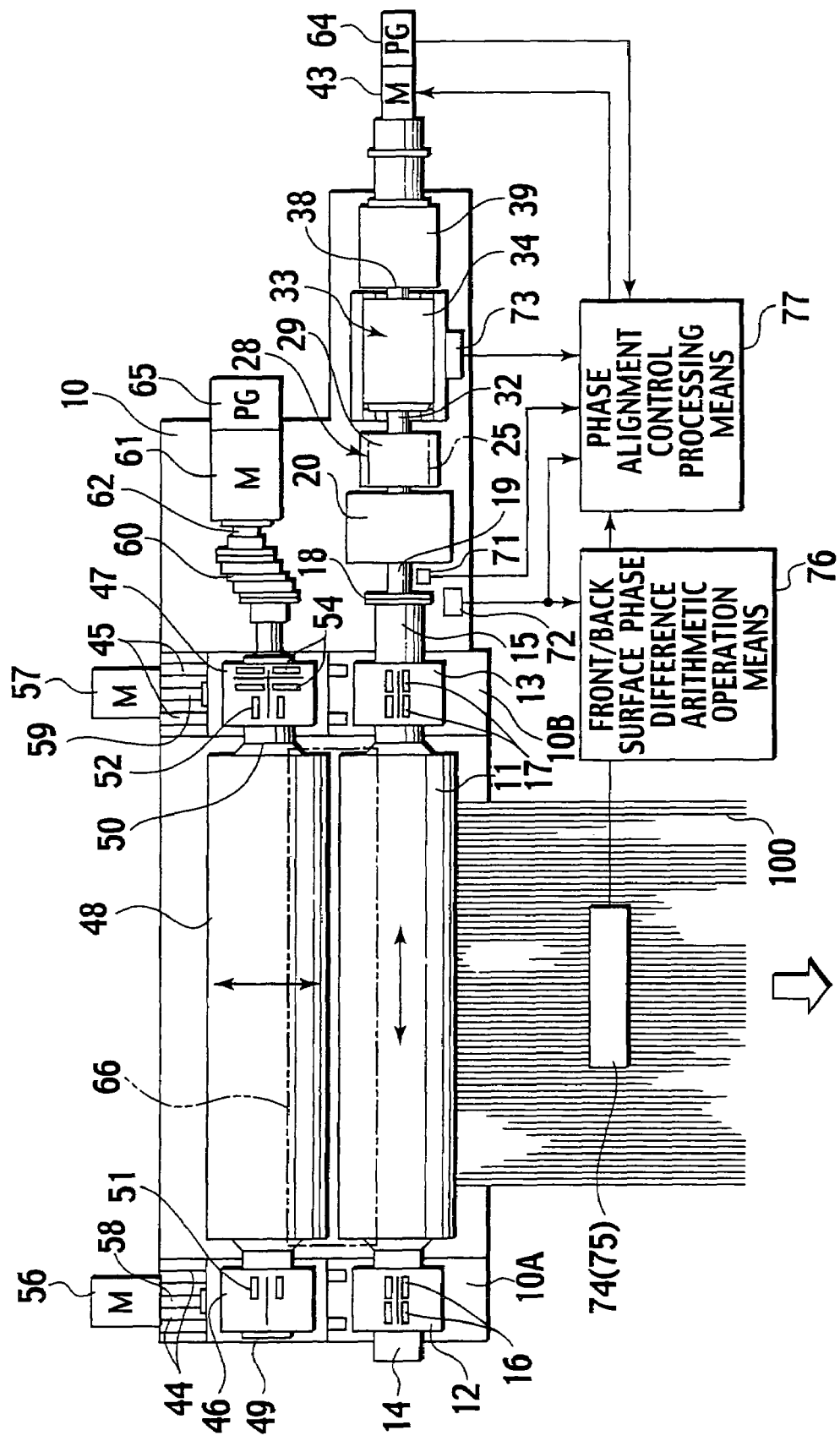
FIG. 1 is a plan view showing a forming phase alignment control device for formed sheet forming, and a formed sheet manufacturing apparatus to which the device concerned is applied, which are according to an embodiment of the present invention.
Figure 2:
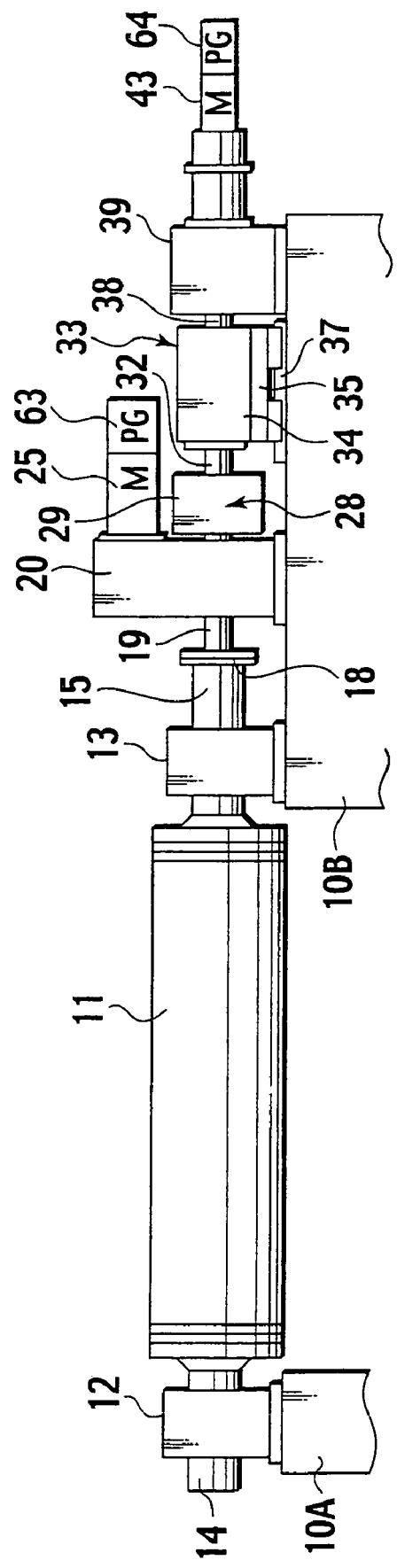
FIG. 2 is a front view of the forming phase alignment control device for the formed sheet forming, and a roll on a phase adjustment side in an axial direction of the formed sheet manufacturing apparatus to which the device concerned is applied, which are according to the embodiment of the present invention.
Figure 3:
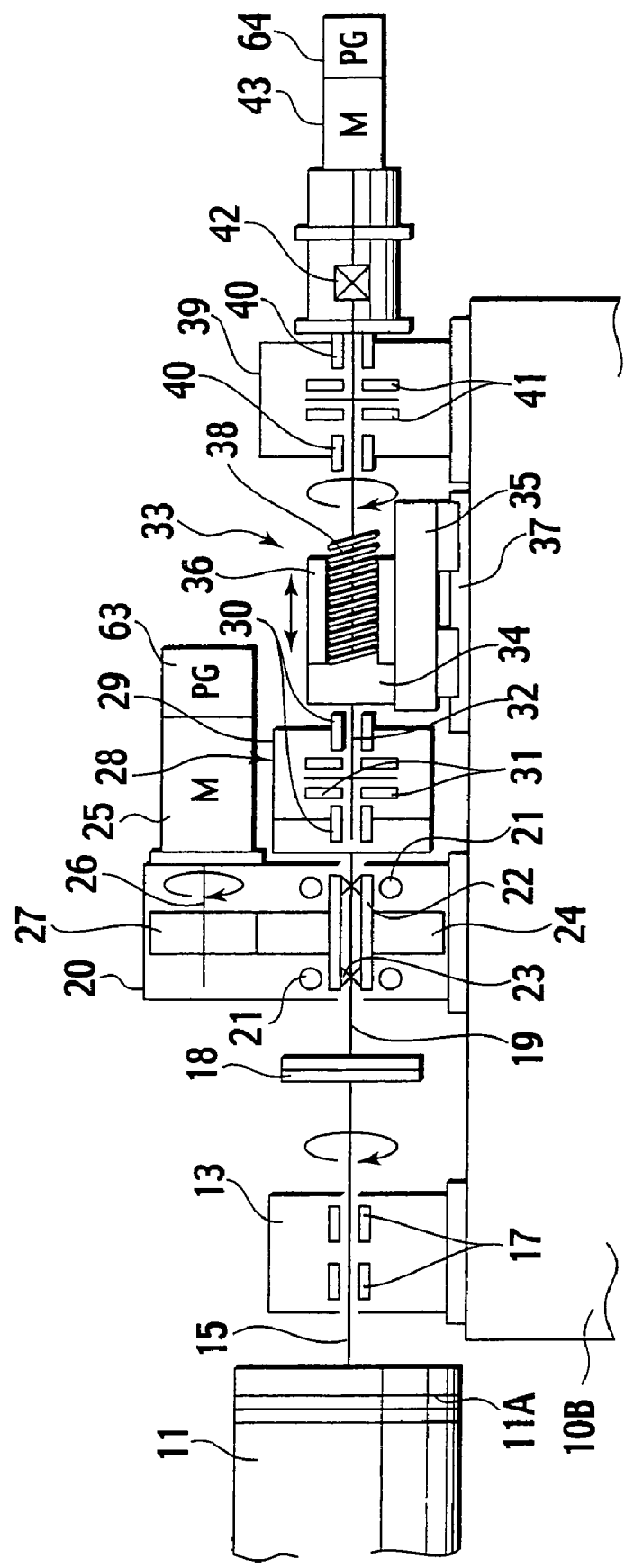
FIG. 3 is a skeleton view of the forming phase alignment control device for the formed sheet forming, and a drive system and a phase adjustment system of the roll on the phase adjustment side in the axial direction of the formed sheet manufacturing apparatus to which the device concerned is applied, which are according to the embodiment of the present invention.

A description is made below of an embodiment of the present invention based on the drawings. In the following description based on the drawings, the same or similar reference numerals are assigned to the same or similar portions. However, it is to be noted that the drawings are schematic, and that relationships between thicknesses and planar dimensions, ratios of thicknesses of respective layers, and the like are different from actual ones.

Moreover, the embodiment described below illustrates apparatuses and methods for embodying a technical concept of the present invention, and with regard to the technical concept of the present invention, materials, shapes, structures, arrangements and the like of constituent parts are not specified to the following ones.

A description is made of a forming phase alignment control device for formed sheet forming, and of a formed sheet manufacturing apparatus to which the device concerned is applied, which are according to the embodiment of the present invention, with reference to FIG. 1 to FIG. 4.

The formed sheet manufacturing apparatus includes a frame 10 which forms a base. Roll bearing boxes 12 and 13 are fixedly attached to an operated side 10A and driven side 10B of the frame 10, respectively.

The roll bearing boxes 12 and 13 support roll shafts 14 and 15 integrally formed on both ends of a second forming roll 11 by radial rolling bearings 16 and 17, respectively, so as to be rotatable about a central axial line of the second forming roll 11 and to be movable in an axial direction (a right and left direction in FIG. 1) thereof.

On the operated side 10A and driven side 10B of the frame 10, by linear guides 44 and 45 located in a roll diameter direction (an up and down direction viewed in FIG. 1) thereof, roll bearing boxes 46 and 47 are provided, respectively, so as to be movable in directions separating from and approaching the second forming roll 11 along the roll diameter direction.

The roll bearing boxes 46 and 47 support roll shafts 49 and 50 integrally formed on both ends of a first forming roll 48 by a radial rolling bearing 51 and a set of a radial rolling bearing 52 and a thrust rolling bearing 54, respectively, so as to be rotatable about a central axial line of the first forming roll 48 and not to be movable in an axial direction (the right and left direction in FIG. 1) thereof. The thrust bearing is provided only in the roll bearing box 47 on one side of the first forming roll 48.

The first forming roll 48 and the second forming roll 11 are opposed in parallel to each other. Circumferential groove-like forming patterns (not shown) are carved on the respective outer circumferential surfaces of the first and second forming rolls 48 and 11 as rolls for form forming.

A shaft end of the roll shaft 15 on the driven side of the second forming roll 11 is coaxially coupled to a roll drive shaft 19 by a coupling (a flange coupling) 18. The roll drive shaft 19 penetrates, in a roll axis direction, a gear box 20 fixedly attached to the driven side 10B of the frame 10 and a hollow gear shaft 22 provided in the gear box 20 by a radial rolling bearing 21 so as to be rotatable.

The roll drive shaft 19 is connected to the hollow gear shaft 22 by a sliding key, a spline 23, or the like in a torque transmission relationship capable of being displaced in the roll axis direction. The hollow gear shaft 22 supports a drive gear 24. To the gear box 20, a roll rotation drive motor (a servo motor) 25 added with a speed reducer is attached.

An output gear 27 is attached to a motor shaft 26 which is an output shaft of the roll rotation drive motor 25. The output gear 27 meshes with the drive gear 24. To the roll rotation drive motor 25, a pulse generator 63 which detects a motor rotation position of the roll rotation drive motor 25 is attached.

Rotation force of the roll rotation drive motor 25 is transmitted to the roll shaft 15 by the motor shaft 26, the output gear 27, the drive gear 24, the hollow gear shaft 22, the sliding key or the spline 23, the roll drive shaft 19, and the coupling 18. By this transmission of the rotation force, the second forming roll 11 rotates about the central axial line thereof. A rotation direction of the second forming roll 11 is counterclockwise viewed in FIG. 4.

A shaft end of the roll drive shaft 19 is connected to a displacement member 34 of phase adjusting unit 33 in the roll axis direction (a product width direction) by a rotating/sliding coupling 28. The rotating/sliding coupling 28 includes a rotating case 29 fixedly connected to the shaft end of the roll drive shaft 19, and a coupling shaft 32 arranged on the same axial line as that of the roll drive shaft 19. The coupling shaft 32 is axially supported by a radial rolling bearing 30 and a thrust rolling bearing 31, which are arranged in the rotating case 29, so as not to be capable of being displaced in an axial line direction (the roll axis direction) with respect to the rotating case 29 and to be relatively rotatable with respect thereto.

The rotating/sliding coupling 28 disconnects transmission of the rotation of the roll drive shaft 19 to the displacement member 34 side by a combination of the above-described radial rolling bearing 30 and thrust rolling bearing 31, and transmits axial force from the displacement member 34 to the roll shaft drive 19. Note that the thrust rolling bearing 31 is given a preload, and connects the rotating case 29 and the coupling shaft 32 to each other without including a backlash in the roll axis direction.

The displacement member 34 of the phase adjusting unit 33 includes a slide base 35, and a ball nut member 36 fixed to the slide base 35 so as not to rotate, and is capable of being displaced in the same direction as the roll axis direction by a linear guide 37 attached to the driven side 10B of the frame 10. The ball nut member 36 is arranged on the same axial line as the central axial line of the second forming roll 11, and a ball screw stock 38 is engaged with the ball nut member 36 in a screwed manner.

The ball screw stock 38 is supported by a radial rolling bearing 40 and a thrust rolling bearing 41, which are provided in a bearing box 39, so as to be rotatable from the bearing box 39. The ball screw stock 38 is coupled, by a shaft coupling 42, to an output shaft (not shown) of a phase-adjusting speed-reduction motor (a servo motor) 43 so as to be driven thereby. To the phase-adjusting speed-reduction motor 43, a pulse generator 64 which detects a motor rotation position of the phase-adjusting speed-reduction motor 43 is attached.

The ball screw stock 38 is rotationally driven by the phase-adjusting speed-reduction motor 43, and the displacement member 34 including the ball nut member 36 is thus displaced in the same direction as the roll axis direction. Such displacement is transmitted to the roll shaft drive 19 and the roll shaft 15 by the rotating/sliding coupling 28, and the second forming roll 11 moves in the axial direction. By such a movement in the axial direction, a phase in the roll axis direction is adjusted.

Here, positions where the respective components are arranged are summarized. All of the roll shafts 14 and 15, the coupling 18, the roll drive shaft 19, the rotating case 29 of the rotating/sliding coupling 28, the coupling shaft 32, the ball nut member 36, and the ball screw stock 38 are located on the same axial line as the central axial line of the second forming roll 11.

Accordingly, the axial force is applied to the position on the central axial line of the second forming roll 11 from the displacement member 34, and the second forming roll 11 moves in the axial direction without an offset in the diameter direction, thus making it possible to adjust the phase in the axial direction of the second forming roll 11 with high precision without being accompanied with a bending moment caused by the offset in the diameter direction.

The bearing boxes 46 and 47 of the first forming roll 48 move parallel to an inter-roll gap direction (the roll diameter direction) by feed screws 58 and 59 which are driven by inter-roll gap adjusting motors 56 and 57, respectively. By such a movement, an inter-roll gap between the second forming roll 11 and the first forming roll 48 is adjusted.

A shaft end of the roll shaft 50 on the driven side of the first forming roll 48 is coupled to a motor shaft 62 of a roll rotation drive motor (a servo motor) 61, so as to be driven thereby, by a universal coupling 60 composed of a Schmidt coupling or the like.

The roll rotation drive motor 61 is one added with a speed reducer. Rotation force of the roll rotation drive motor 61 is transmitted to the roll shaft 50 by the motor shaft 62 and the universal coupling 60, and by such transmission of the rotation force, the first forming roll 48 rotates about the central axial line thereof. To the roll rotation drive motor 61, there is attached a pulse generator 65 which detects a motor rotation position of the roll rotation drive motor 61.

A T-die 66 is disposed at a position immediately above the gap portion between the second forming roll 11 and the first forming roll 48. The T-die 66 supplies resin for forming the formed sheet in a fused state to the gap portion between the second forming roll 11 and the first forming roll 48.

The fused resin supplied from the T-die 66 to the gap portion between the second forming roll 11 and the first forming roll 48 is formed into a sheet shape between the rolls concerned by an extrusion forming method, and becomes a formed sheet (a product) 100, both surfaces of which are formed. Then, the formed sheet proceeds to a next step.

Next, a description is made of a control system of the formed sheet manufacturing apparatus including the forming phase alignment control device for the formed sheet forming according to the present invention.

A position in a flowing direction of the formed sheet (the product) 100 and rotation phases of the second forming roll 11 and the first forming roll 48 are managed by the pulse generators (PGs) 63 and 65 which are provided for the roll rotation drive motors 25 and 61, respectively. Moreover, an origin of each rotation of the second forming roll 11 and the first forming roll 48 is instructed by an output signal of a rotation origin point sensor 71 to be described later.

On the drive side 10B of the frame 10, there are provided the rotation origin point sensor 71 which optically detects a rotation origin mark (not shown) put against the roll drive shaft 19, a first phase detection sensor 72 composed of a reflected laser position sensor or the like, which optically detects a position in the roll axis direction of the second forming roll 11 from a position in the roll axis direction of the coupling 18, and a second phase detection sensor 73 composed of a laser linear encoder or the like, which optically detects a position in the roll axis direction of the displacement member 34 of the phase adjusting unit 33.

In a transportation passage of the double-surface formed sheet 100, at a position (a phase measuring point Ps of FIG. 4) where a formed state of the double-surface formed sheet 100 becomes stable in such a manner that the double-surface formed sheet 100 is cooled and solidified, there are arranged an upper formed-shape detector 74 which detects a formed shape of a front surface (an upper surface) 100A of the double-surface formed sheet 100, and a lower formed-shape detector 75 which detects a formed shape of a back surface (a lower surface) 100B of the double-surface formed sheet 100. The upper formed-shape detector 74 and the lower formed-shape detector 75 are opposed to each other.

The upper formed-shape detector 74 and the lower formed-shape detector 75 are composed of imaging means such as a linear image sensor and a CCD, are not in contact with the double-surface formed sheet 100, and optically detect the formed shapes of the front surface 100A and back surface 100B of the double-surface formed sheet 100.

Detection signals of the upper formed-shape detector 74 and the lower formed-shape detector 75 are inputted to front/back-surface phase difference arithmetic operating unit 76. The front/back-surface phase difference arithmetic operating unit 76 is composed of image analysis processing means or the like, compares the detection signal of the upper formed-shape detector 74 and the detection signal of the lower formed-shape detector 75 with each other, and calculates a forming phase difference between the formed shape of the front surface 100A of the double-surface formed sheet 100 and the formed shape of the back surface 100B of the double-surface formed sheet 100 with respect to a sheet width direction (the roll axis direction).

A value of the forming phase difference calculated by the front/back-surface phase difference arithmetic operating unit 76 is a measurement value measured directly from an object, as the product, for which the phase difference is to be measured. A signal indicating the value of the forming phase difference is inputted to phase alignment control processing unit 77.

The phase alignment control processing unit 77 is one of a microcomputer type, receives sensor signals individually from the pulse generator 64, the rotation origin position sensor 71, the first phase detection sensor 72, and the second phase detection sensor 73, and receives such a phase difference signal indicating the value of the forming phase difference from the front/back-surface phase difference arithmetic operating unit 76. Moreover, the phase alignment control processing unit 77 outputs a motor drive instruction to the phase-adjusting speed-reduction motor 43 so that the phase difference in the roll axis direction between the formed shape of the front surface 100A of the double-surface formed sheet 100 and the formed shape of the back surface 100B of the double-surface formed sheet 100 can be zero.

The phase-adjusting speed-reduction motor 43 is rotationally driven according to the motor drive instruction, the ball screw stock 38 is rotationally driven at a predetermined rotation angle by the phase-adjusting speed-reduction motor 43, and the displacement member 34 of the phase adjusting unit 33 is thus displaced in the roll axis direction. Accompanied with such displacement, the second forming roll 11 is displaced with respect to the first forming roll 48 in the roll axis direction. By such displacement of the second forming roll 11 in the roll axis direction, forming phases in the roll axis direction are adjusted, that is, phases are aligned therein.

A feedback control for such a phase alignment control by the phase-adjusting speed-reduction motor 43 is performed according to a hybrid method by semi-closed feedback compensation using a motor position signal outputted by the pulse generator 64 and fully-closed feedback compensation using a position signal in the roll axis direction outputted by the first phase detection sensor 72.

Moreover, while the phase-adjusting speed-reduction motor 43 is in a resting state, the phase alignment control processing unit 77 compares an output signal of the first phase detection sensor 72 and an output signal of the second phase detection sensor 73 with each other, and when a difference occurs therebetween, determines that heat deformation and the like have occurred in the roll mechanical system, and then performs a compensation control therefor.

The forming phase adjustment in the roll axis direction (the product width direction) by the phase alignment control processing unit 77 is managed by an output signal of the pulse generator (PG) 64 of the phase-adjusting speed-reduction motor 43 and the output signals of the first phase detection sensor 72 and the second phase detection sensor 73.

Figure 4:
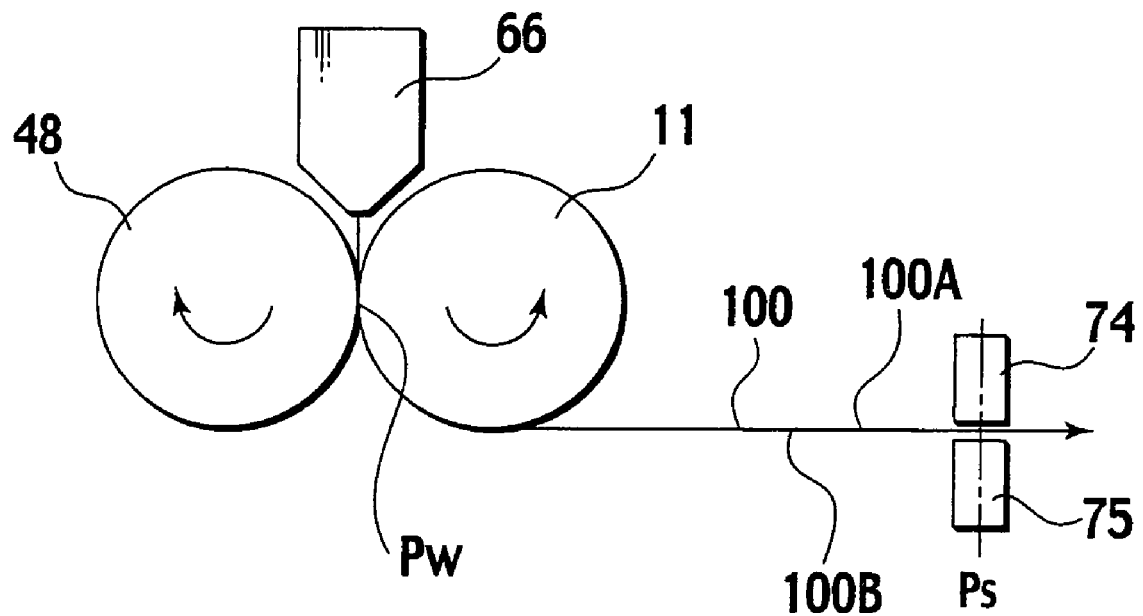
FIG. 4 is a schematic side view of the forming phase alignment control device for the formed sheet forming, and the formed sheet manufacturing apparatus to which the device concerned is applied, which are according to the embodiment of the present invention.

Since the position in the flowing direction of the formed sheet (the product sheet) 100 is managed by the pulse generators 63 and 65 owned by the roll rotation drive motors 25 and 61, the number of pulses outputted from each thereof in a range from a forming point Pw to the phase measuring point Ps, which are shown in FIG. 4, is set as a parameter of a control offset amount (a delay amount) in the phase alignment control processing unit 77.

With regard to receiving timing of the phase difference signal from the front/back-surface phase difference arithmetic operating unit 76, the phase alignment control processing unit 77 handles, as one section (one set), a phase difference signal in a range from an end of passage of the above-described control offset amount to an end of passage of such an offset amount of the next rotation origin signal by using, as a reference, a rotation origin signal outputted by the rotation origin position sensor 71. In such a way, the phase alignment control processing unit 77 observes data on the phase difference for one cycle (for one rotation of the roll) from the roll rotation origin to the next origin. In such a way, the phase alignment control processing unit 77 performs the phase alignment control based on the phase difference value signal for one rotation of the second forming roll 11.

Variations in the phase difference data are not necessarily always completely periodic. The phase difference data includes data of long-period variations disrelated to the rotations of the forming rolls 11 and 48, and data of short-period variations owing to sudden disturbances. Accordingly, considering these variations, the phase difference data for the necessary number of rotations, for example, five rotations and ten rotations, is averaged, and by using an obtained result as a phase control signal, controls a drive of a phase adjustment mechanism, that is, the phase-adjusting speed-reduction motor 43. The phase adjustment mechanism always repeats an adjustment operation for compensating the periodic variations in one rotation with the same pattern during the set number of rotations to be averaged, and updates a control amount for the next set of rotations to be averaged.

As described above, the phase adjustment is implemented by using, as a control deviation of the phase alignment control, an actual measurement value of a phase error of the formed sheet (the product sheet) 100 as the final product. Accordingly, the phase error owing to the residual displacement which occurs mechanically can be compensated, thus making it possible to produce a high-precision double-surface formed sheet with little error between the phases of the front and back surfaces.

In summary, in the present invention, the information on the forming precision of the final product, which has not been employed in the related art, is introduced, and the phase control is performed by processing the signals including the information. Accordingly, compound variations in the diameter direction owing to the rotations of the forming rolls and the like, which occur on the mechanism side, are cancelled. Moreover, it is premised that the compound variations in the roll axis direction essentially occur irrespective of a magnitude thereof. The variations which have thus occurred are corrected by a follow-up control for the position of the occurrence, thus making it possible to maintain the forming phase precision of the front and back surfaces at high precision. In such a way, front/back positional precision between the formed shapes of the optical high-precision double-surface formed sheet can be set at precision within few micrometers.

Note that, though the above-described embodiment illustrates an example of implementing the forming phase measurement of the product in an in-line manner, a similar control to that of the above-described embodiment is enabled even if using an off-line measurement where the measured position and the roll rotation origin can be made to correspond to each other one by one in accordance with the above-described embodiment. However, in this case, a setting range of the control parameters is limited in terms of the operation in comparison with such an in-line measurement.

Although the present invention has been described above based on the embodiment, the present invention is not limited to this, and the respective units and components can be replaced by those with arbitrary constructions, which have similar functions thereto.

What is claimed is:

1. A forming phase alignment device, comprising:
a first forming roll;
a second forming roll configured to form a double-surface formed sheet together with the first forming roll, the second forming roll being provided parallel and opposite to the first forming roll;
a phase adjusting unit configured to move the second forming roll in an axial direction of the second forming roll;
an upper formed-shape detector configured to detect a formed shape of a front surface of the double-surface formed sheet;
a lower formed-shape detector configured to detect a formed shape of a back surface of the double-surface formed sheet;
a front/back-surface phase difference arithmetic operation unit configured to compare a detection signal of the upper formed-shape detector and a detection signal of the lower formed-shape detector with each other, calculate a forming phase difference between the formed shape of the front surface of the double-surface formed sheet and the formed shape of the back surface of the double-surface formed sheet with respect to the axial direction, and output a phase difference value signal indicating the forming phase difference; and
a phase alignment control processing unit configured to receive the phase difference value signal, and output an instruction to the phase adjusting unit so that the forming phase difference can be reduced.

2. The forming phase alignment device according to claim 1, wherein the phase adjusting unit comprises:
a screw device,
wherein the screw device comprises:
a servo motor;
a screw stock member configured to be rotationally driven by the servo motor; and
a nut member configured to move the second forming roll in the axial direction, the nut member being engaged with the screw stock member in a screwed manner, fixed so as not to rotate, and displaced in a same direction as the axial direction of the second forming roll by rotation of the screw stock member, and
the phase alignment control processing unit being configured to output a drive instruction to the servo motor so that the forming phase difference can be reduced.

3. The forming phase alignment device according to claim 1, wherein the phase alignment control processing unit is configured to perform a phase alignment control based on the phase difference value signal for one rotation of the second forming roll.

4. The forming phase alignment device according to claim 2, wherein the phase alignment control processing unit is configured to perform a phase alignment control based on the phase difference value signal for one rotation of the second forming roll.

5. The forming phase alignment device according to claim 1, wherein the phase alignment control processing unit is configured to perform a phase alignment control based on an average value of the phase difference value signals for plural rotations of the second forming roll.

6. The forming phase alignment device according to claim 2, wherein the phase alignment control processing unit is configured to perform a phase alignment control based on an average value of the phase difference value signals for plural rotations of the second forming roll.

7. The forming phase alignment device according to claim 1, wherein the upper formed-shape detector optically detects the formed shape of the front surface of the double-surface formed sheet.

8. The forming phase alignment device according to claim 1, wherein the lower formed-shape detector optically detects the formed shape of the back surface of the double-surface formed sheet.

9. The forming phase alignment device according to claim 1, wherein the upper formed-shape detector comprises a linear image sensor.

10. The forming phase alignment device according to claim 1, wherein the lower formed-shape detector comprises a linear image sensor.

11. The forming phase alignment device according to claim 1, further comprising a rotation origin point sensor.

12. The forming phase alignment device according to claim 11, wherein the rotation origin point sensor optically detects a rotation origin mark located on a roll drive shaft.

13. The forming phase alignment device according to claim 11, wherein the rotation origin point sensor generates a rotation origin signal and outputs the rotation origin signal to the phase alignment control processing unit.

* * * * *